(12) United States Patent
Lin et al.

(10) Patent No.: US 10,216,646 B2
(45) Date of Patent: Feb. 26, 2019

(54) EVICTING APPROPRIATE CACHE LINE USING A REPLACEMENT POLICY UTILIZING BELADY'S OPTIMAL ALGORITHM

(71) Applicant: Board of Regents, The University of Texas System, Austin, TX (US)

(72) Inventors: Calvin Lin, Austin, TX (US); Akanksha Jain, Austin, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 31 days.

(21) Appl. No.: 15/212,920

(22) Filed: Jul. 18, 2016

(65) Prior Publication Data

US 2017/0052905 A1 Feb. 23, 2017

Related U.S. Application Data

(60) Provisional application No. 62/206,900, filed on Aug. 19, 2015.

(51) Int. Cl.
*G06F 12/128* (2016.01)
*G06F 12/0831* (2016.01)

(52) U.S. Cl.
CPC ........ *G06F 12/128* (2013.01); *G06F 12/0831* (2013.01); *G06F 2212/621* (2013.01)

(58) Field of Classification Search
CPC .. G06F 12/128; G06F 12/0831; G06F 12/123; G06F 12/122; G06F 12/125; G06F 12/126; G06F 2212/621
See application file for complete search history.

(56) References Cited

U.S. PATENT DOCUMENTS 6,339,813 B1    1/2002  Smith, III et al.
6,681,295 B1 *  1/2004  Root .................. G06F 9/30047
                                                          711/128

(Continued)

OTHER PUBLICATIONS

Jain et al., "Back to the Future: Leveraging Belady's Algorithm for Improved Cache Replacement," 43rd International Symposium on Computer Architecture (ISCA), Seoul, South Korea, Jun. 18-22, 2016, pp. 1-12.
Wu et al., "SHiP: Signature-based Hit Predictor for High Perofrmance Caching," MICRO' 11, Dec. 3-7, 2011, Porto Alegre, Brazil, pp. 1-12.

(Continued)

*Primary Examiner* — David Yi
*Assistant Examiner* — Nicholas A. Paperno
(74) *Attorney, Agent, or Firm* — Robert A. Voigt, Jr.; Winstead, P.C.

(57) ABSTRACT

A method, system and computer program product for cache replacement. The present invention leverages Belady's optimal replacement algorithm by applying it to past cache accesses to inform future cache replacement decisions. The occupied cache capacity of a cache is tracked at every time interval using an occupancy vector. The cache capacity is retroactively assigned to the cache lines of the cache in order of their reuse, where a cache line is considered to a cache hit if the cache capacity is available at all times between two subsequent accesses. The occupancy vector is updated using a last touch timestamp of a current memory address. A determination is made as to whether the current memory address results in a cache hit or a cache miss based on the updated occupancy vector. The replacement state for the cache line is stored using the results of the determination.

51 Claims, 7 Drawing Sheets

(56) References Cited

U.S. PATENT DOCUMENTS

| | | | |
|---|---|---|---|
| 6,748,492 | B1 | 6/2004 | Rowlands et al. |
| 7,246,203 | B2 | 7/2007 | Moat et al. |
| 2011/0238919 | A1 | 9/2011 | Gibson et al. |
| 2012/0324172 | A1 | 12/2012 | Rabinovitch et al. |
| 2013/0138891 | A1* | 5/2013 | Chockler .............. G06F 9/5016 711/133 |
| 2013/0262767 | A1 | 10/2013 | Lih et al. |
| 2014/0006717 | A1* | 1/2014 | Steely, Jr. ........... G06F 12/0862 711/133 |
| 2014/0244619 | A1 | 8/2014 | Doroshenko |
| 2015/0127905 | A1* | 5/2015 | Chang ................ G06F 12/0871 711/118 |
| 2015/0149730 | A1* | 5/2015 | Hu ....................... G06F 3/0613 711/136 |

OTHER PUBLICATIONS

Khan et al., "Sampling Dead Block Prediction for Last-Level Caches," 43rd Annual IEEE/ACM International Symposium on Microarchitecture, 2010, pp. 175-186.

Jaleel et al., "High Performance Cache Replacement Using Re-Reference Interval Prediction (RRIP)," ISCA'10, Jun. 19-23, 2010, Saint-Malo, France, pp. 1-12.

L. A. Belady, "A Study of Replacement Algorithms for a Virtual Storage Computer," IBM Systems Journal, vol. 5, No. 2, 1966, pp. 78-101.

International Search Report and Written Opinion for International Application No. PCT/US16/42817 dated Nov. 18, 2016, pp. 1-19.

International Preliminary Report on Patentability for International Application No. PCT/US2016/042817 dated Feb. 20, 2018, pp. 1-15.

\* cited by examiner

EVICTING APPROPRIATE CACHE LINE USING A REPLACEMENT POLICY UTILIZING BELADY'S OPTIMAL ALGORITHM

GOVERNMENT INTERESTS

This invention was made with government support under Grant Nos. DRL1441009 and CNS1138506 awarded by the National Science Foundation. The U.S. government has certain rights in the invention.

TECHNICAL FIELD

The present invention relates generally to caches, and more particularly to evicting an appropriate cache line using a replacement policy utilizing Belady's optimal algorithm.

BACKGROUND

A CPU cache is a cache used by the central processing unit (CPU) of a computer to reduce the average time to access data from the main memory. The cache is a smaller, faster memory which stores copies of the data from frequently used main memory locations. Most CPUs have different independent caches, including instruction and data caches, where the data cache is usually organized as a hierarchy of more cache levels (L1, L2, etc.).

When the processor needs to read from or write to a location in main memory, it first checks whether a copy of that data is in the cache. If so, the processor immediately reads from or writes to the cache, which is much faster than reading from or writing to main memory.

Data is transferred between memory and cache in blocks of fixed size, called cache lines. When a cache line is copied from memory into the cache, a cache entry is created. The cache entry will include the copied data as well as the requested memory location (also referred to as a "tag").

As a result, when the processor needs to read from or write to a location in main memory, it first checks for a corresponding entry in the cache. The cache checks for the contents of the requested memory location in any cache lines that might contain that address. If the processor finds that the memory location is in the cache, a cache hit has occurred. However, if the processor does not find the memory location in the cache, a cache miss has occurred. In the case of a cache hit, the processor immediately reads or writes the data in the cache line. For a cache miss, the cache allocates a new entry and copies in data from main memory. Then the request is fulfilled from the contents of the cache.

In order to make room for the new entry on a cache miss, the cache may have to evict one of the existing entries. The heuristic that it uses to choose the entry to evict is called the replacement policy. The fundamental problem with any replacement policy is that it must predict which existing cache entry is least likely to be used in the future. Predicting the future is difficult, so there is no perfect way to choose among the variety of replacement policies available.

One such cache replacement algorithm (cache replacement policy) is Belady's algorithm. The most efficient caching algorithm would be to always discard the information that will not be needed for the longest time in the future. This optimal result is referred to as Belady's optimal algorithm. However, the implementation of Belady's optimal algorithm is impractical in that it looks into the future to identify the cache line that will be reused furthest in the future.

As a result, existing replacement policies use heuristics, such as Least Recently Used (LRU) or Most Recently Used (MRU), which each work well for different workloads. However, such existing replacement policies cannot exploit all forms of reuse, such as short-term reuse, medium-term reuse and long-term reuse, whereas, Belady's optimal algorithm can effectively exploit all three forms of reuse.

Furthermore, the performance of recent policies for the SPEC CPU2006 (suite of benchmark applications designed to test the CPU performance) indicate that there remains a significant gap between the best current policy and the Belady's optimal algorithm policy.

As a result, a better replacement policy needs to be implemented that is not simply based on any heuristic that is geared towards a particular class of access patterns. Instead, the replacement policy should apply Belady's optimal algorithm to better inform future cache replacement decisions.

SUMMARY

In one embodiment of the present invention, a method for cache replacement comprises tracking, by a processor, an occupied cache capacity of a cache at every time interval using an occupancy vector, where the cache capacity corresponds to a number of cache lines of the cache. The method further comprises retroactively, by the processor, assigning the cache capacity to cache lines of the cache in order of their reuse, where a cache line is considered to be a cache hit if the cache capacity is available at all times between two subsequent accesses and where a cache line is considered to be a cache miss if the cache capacity is not available at all times between the two subsequent accesses. The method additionally comprises updating an occupancy vector using a last touch timestamp of a current memory address. Furthermore, the method comprises determining if the current memory address results in a cache hit or a cache miss based on the updated occupancy vector. Additionally, the method comprises storing a replacement state for a cache line of the cache using results of the determination.

Other forms of the embodiment of the method described above are in a system and in a computer program product.

In another embodiment of the present invention, a method for cache replacement comprises applying Belady's optimal algorithm to previous memory accesses to learn behavior of individual load instructions. The method further comprises training a predictor to make eviction decisions based on the learned behavior of individual load instructions. The method additionally comprises receiving a load instruction. Furthermore, the method comprises generating, by a processor, a first indicator to indicate whether a cache line of a cache is to be classified with a low eviction priority or a high eviction priority in response to determining if the load instruction results in a cache hit or a cache miss based on the training. Additionally, the method comprises storing a replacement state for the cache line of the cache using the first indicator.

Other forms of the embodiment of the method described above are in a system and in a computer program product.

The foregoing has outlined rather generally the features and technical advantages of one or more embodiments of the present invention in order that the detailed description of the present invention that follows may be better understood. Additional features and advantages of the present invention will be described hereinafter which may form the subject of the claims of the present invention.

BRIEF DESCRIPTION OF THE DRAWINGS

A better understanding of the present invention can be obtained when the following detailed description is considered in conjunction with the following drawings, in which.

DETAILED DESCRIPTION

In the following description, numerous specific details are set forth to provide a thorough understanding of the present invention. However, it will be apparent to those skilled in the art that the present invention may be practiced without such specific details. In other instances, well-known circuits have been shown in block diagram form in order not to obscure the present invention in unnecessary detail. For the most part, details considering timing considerations and the like have been omitted inasmuch as such details are not necessary to obtain a complete understanding of the present invention and are within the skills of persons of ordinary skill in the relevant art.

Figure 1:
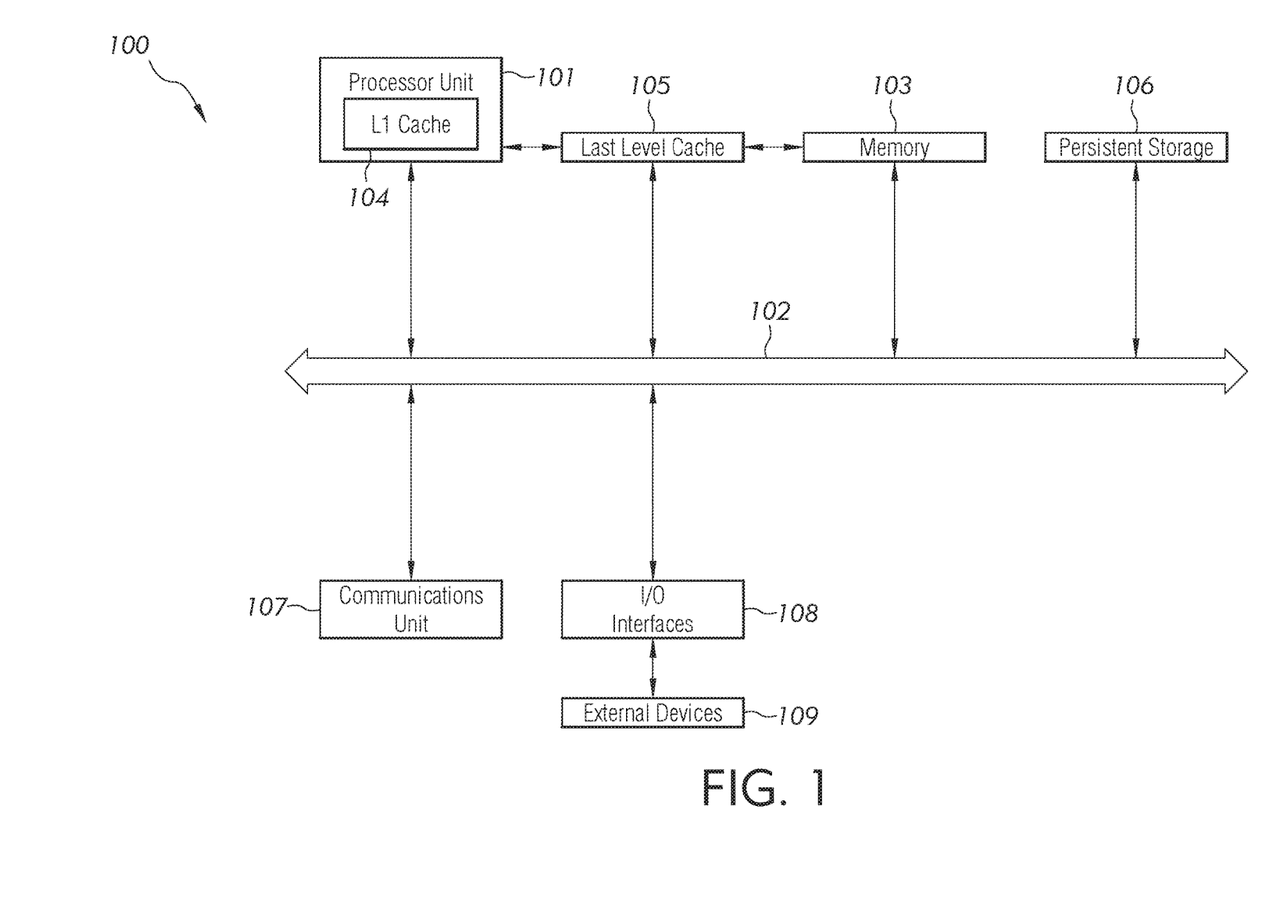
FIG. 1 illustrates a hardware configuration of a computer system configured in accordance with an embodiment of the present invention.

Referring now to the Figures in detail, FIG. 1 illustrates a hardware configuration of a computer system 100 which is representative of a hardware environment for practicing the present invention. Computer system 100 has a processor unit 101 coupled to various other components by system bus 102 as shown in FIG. 1. Processor unit 101 is configured to execute instructions for software that may be loaded into memory 103. Processor unit 101 may be a set of one or more processors or may be a multi-processor core, depending on the particular implementation. Furthermore, processor unit 101 may be implemented using one or more heterogeneous processor systems in which a main processor is present with secondary processors on a single chip. As another illustrative example, processor unit 101 may be a symmetric multi-processor system containing multiple processors of the same type. Processor unit 101 may contain one or more caches 104, such as a level 1 cache ("L1 cache") (e.g., L1 instruction cache, L1 data cache).

Furthermore, as illustrated in FIG. 1, processor unit 101 is configured to access one or more additional cache levels (identified as "last level cache" 105 in FIG. 1), such as a level 2 (L2) and a level (L3) cache. Multi-level caches generally operate by checking the fastest, level 1 (L1) cache 104 first; if it hits, processor unit 101 proceeds at high speed. If that smaller cache misses, the next fastest cache (e.g., L2 cache) is checked, and so on, before external memory, such as memory 103, is checked. The principles of the present invention are to include any number of levels of cache and are not to be limited in scope to the three levels discussed above.

As further illustrated in FIG. 1, computer system 100 may include a persistent storage 106. Memory 103 and persistent storage 106 are examples of storage devices. A storage device is any piece of hardware that is capable of storing information, such as, for example without limitation, data, program code in functional form, and/or other suitable information either on a temporary basis and/or a permanent basis. Memory 103, in these examples, may be, for example, a random access memory or any other suitable volatile or non-volatile storage device. Persistent storage 106 may take various forms depending on the particular implementation. For example, persistent storage 106 may contain one or more components or devices. For example, persistent storage 106 may be a hard drive, a flash memory, a rewritable optical disk, a rewritable magnetic tape, or some combination of the above. The media used by persistent storage 106 also may be removable. For example, a removable hard drive may be used for persistent storage 106.

Furthermore, computer system 100 includes a communications unit 107, such as a network interface card. Communications unit 107 may provide communications through the use of either or both physical and wireless communication links.

Additionally, computer system 100 includes input/output (I/O) interfaces 108 for allowing input and output of data with other external devices 109 that may be connected to computer system 100. For example, such external devices 109 may include a keyboard, a mouse, a speaker, a display and/or some other suitable input or output device.

Instructions for the operating system, applications and/or programs may be located in the storage devices, such as memory 103, persistent storage 106, which are in communication with processor unit 101 through system bus 102. For example, an application may include a program for evicting an appropriate cache line using a replacement policy utilizing Belady's optimal algorithm as discussed further below in association with FIGS. 2-4, 5A-5C and 6-7. These instructions may be loaded into memory 103 for execution by processor unit 101. The processes of the different embodiments may be performed by processor unit 101 using computer implemented instructions, which may be located in a memory, such as memory 103.

These instructions are referred to as program code, computer usable program code, or computer readable program code that may be read and executed by a processor in processor unit 101. The program code in the different embodiments may be embodied on different physical or tangible computer readable media, such as memory 103 or persistent storage 106.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As discussed in the Background section, existing replacement policies use heuristics, such as LRU (Least Recently Used) or MRU (Most Recently Used), which each work well for different workloads. However, such existing replacement policies cannot exploit all forms of reuse, such as short-term reuse, medium-term reuse and long-term reuse, whereas, Belady's optimal algorithm can effectively exploit all three forms of reuse. Furthermore, the performance of recent policies for the SPEC CPU2006 (suite of benchmark applications designed to test the CPU performance) indicate that there remains a significant gap between the best current policy and the Belady's optimal algorithm policy. As a result, a better replacement policy needs to be implemented that is not simply based on any heuristic that is geared towards a particular class of access patterns. Instead, the replacement policy should apply Belady's optimal algorithm to better inform future cache replacement decisions.

Figure 2:
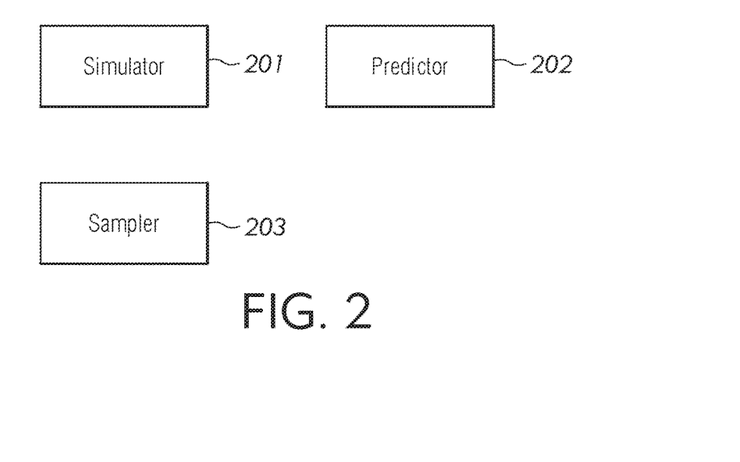
FIG. 2 illustrates a block diagram of the software components used to form the replacement policy of the present invention in accordance with an embodiment of the present invention.
Figure 3:
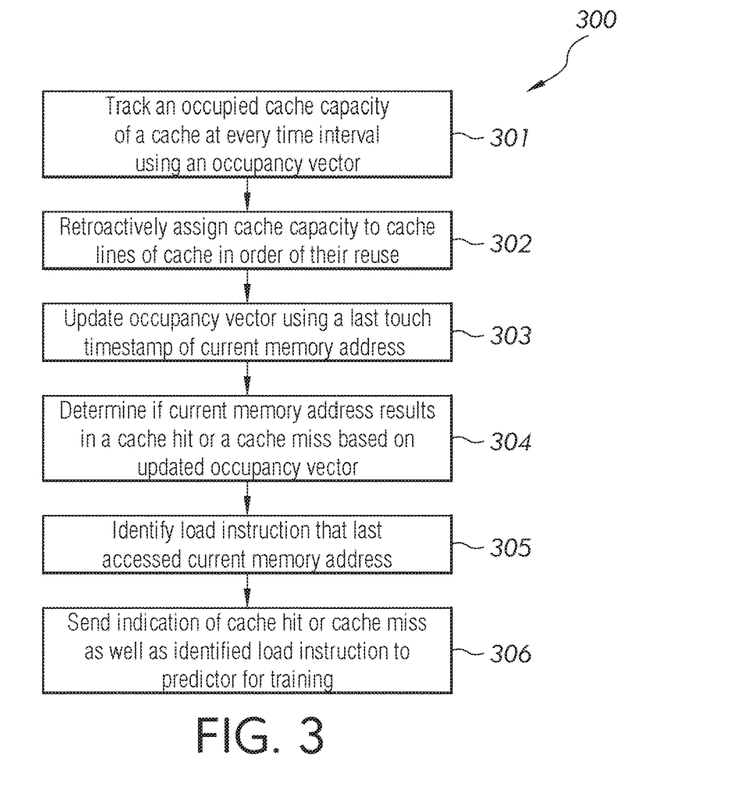
FIG. 3 is a flowchart of a method for utilizing Belady's optimal algorithm to train the predictor of the present invention in accordance with an embodiment of the present invention.
Figure 4:
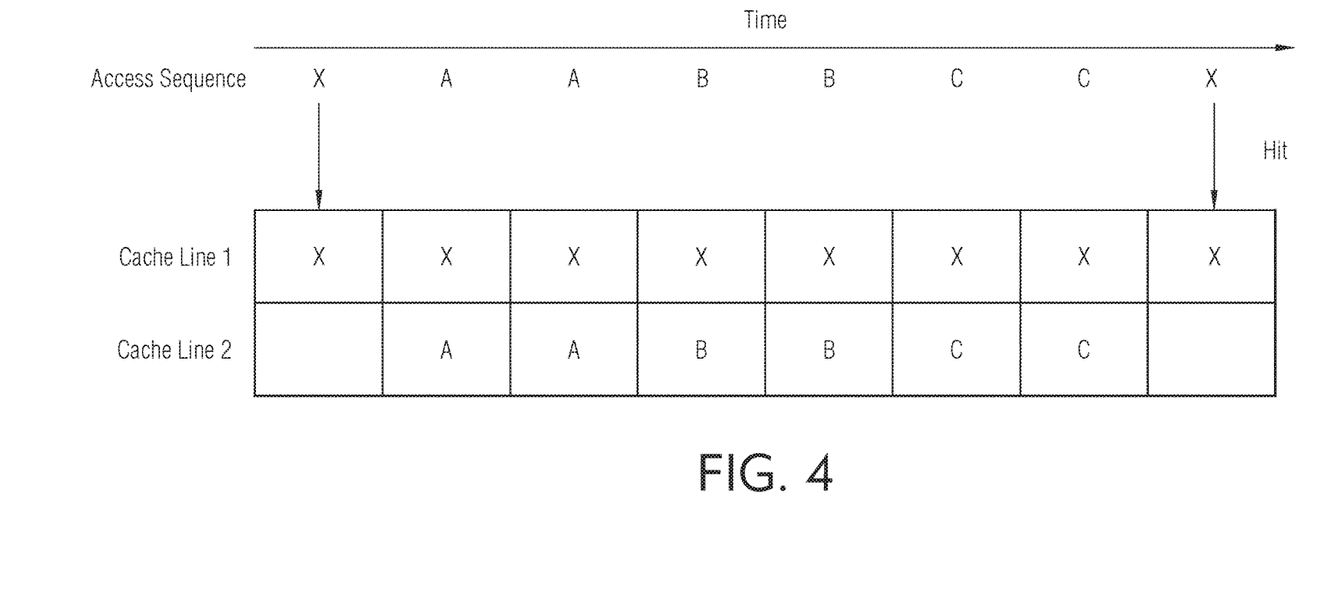
FIG. 4 illustrates the intuition used by the simulator to reconstruct the behavior of the cache as if Belady's optimal algorithm had been used in accordance with an embodiment of the present invention.
Figure 5A:
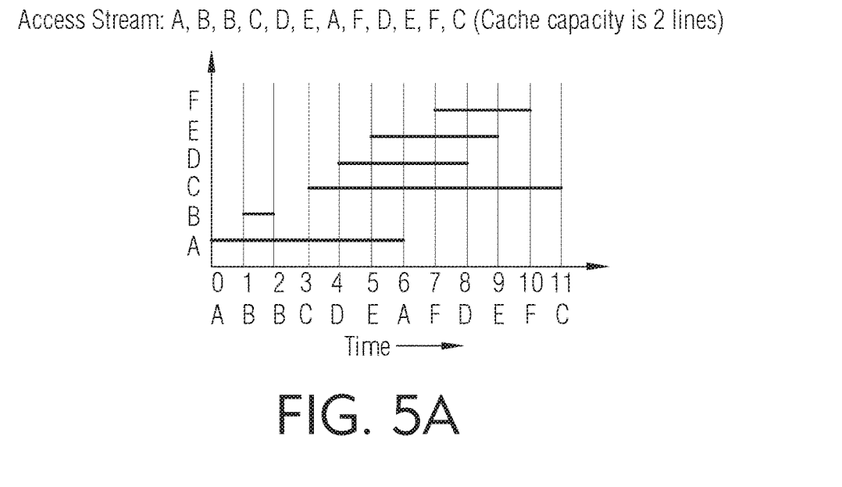
FIG. 5A illustrates the timeline view of the access stream in an example of utilizing the simulator in accordance with an embodiment of the present invention.
Figure 5B:
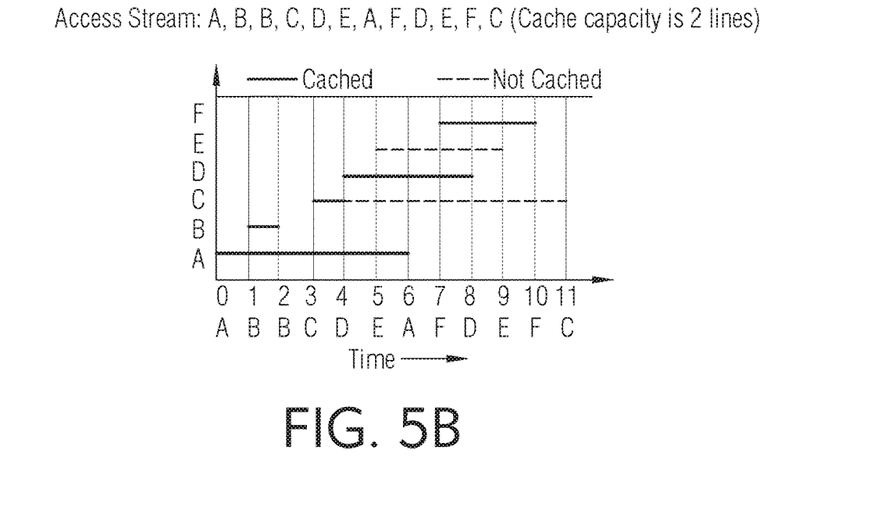
FIG. 5B illustrates the optimal solution (4 hits) in an example of utilizing the simulator in accordance with an embodiment of the present invention.
Figure 5C:
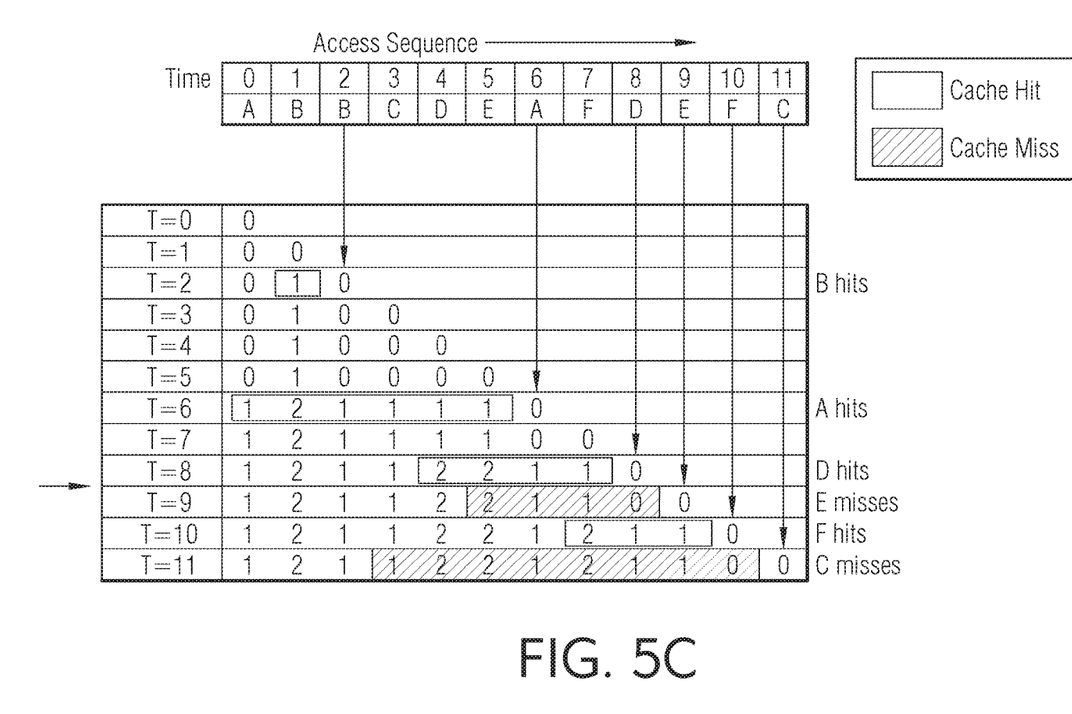
FIG. 5C illustrates the state of the occupancy vector over time in an example of utilizing the simulator in accordance with an embodiment of the present invention.
Figure 6:
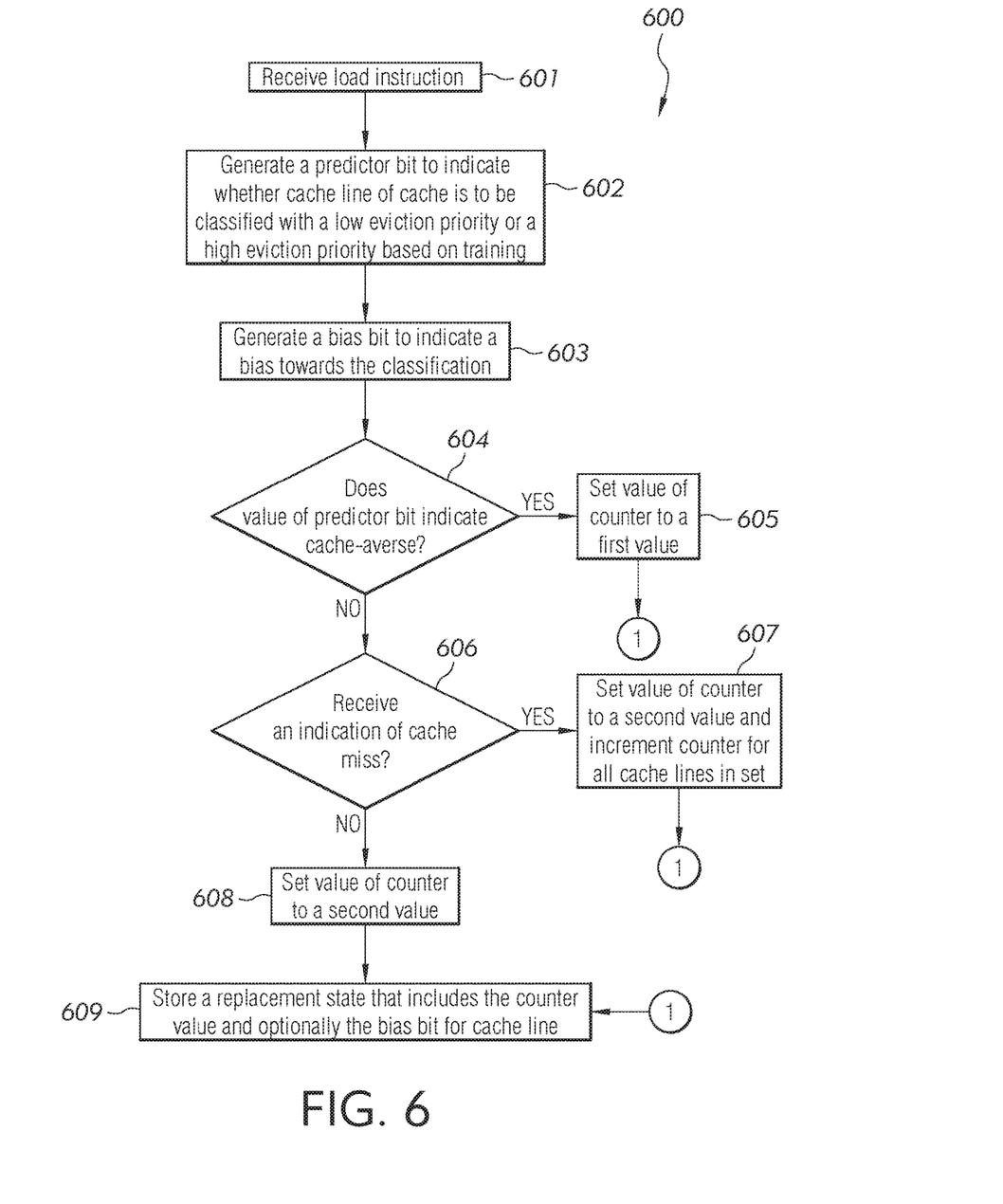
FIG. 6 is a flowchart of a method for storing a replacement state used for evicting an appropriate cache line in accordance with an embodiment of the present invention.
Figure 7:
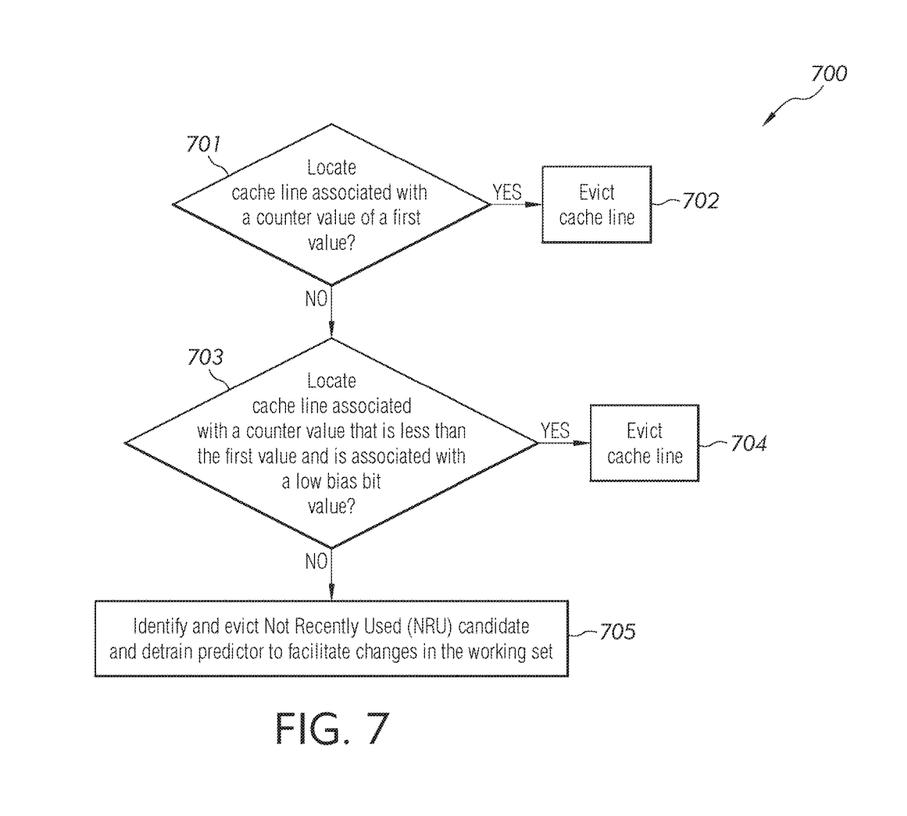
FIG. 7 is a flowchart of a method for evicting an appropriate cache line using a replacement policy utilizing Belady's optimal algorithm in accordance with an embodiment of the present invention.

The principles of the present invention provide a means for a replacement policy that applies Belady's optimal algorithm to better inform future cache replacement decisions as discussed below in connection with FIGS. 2-4, 5A-5C and 6-7. FIG. 2 illustrates a block diagram of the software components used to form the replacement policy of the present invention. FIG. 3 is a flowchart of a method for utilizing Belady's optimal algorithm to train the predictor of the present invention. FIG. 4 illustrates the intuition used by the simulator to reconstruct the behavior of the cache as if Belady's optimal algorithm had been used. FIG. 5A illustrates the timeline view of the access stream in an example of utilizing the simulator. FIG. 5B illustrates the optimal solution (4 hits) in an example of utilizing the simulator. FIG. 5C illustrates the state of the occupancy vector over time in an example of utilizing the simulator. FIG. 6 is a flowchart of a method for storing a replacement state used for evicting an appropriate cache line. FIG. 7 is a flowchart of a method for evicting an appropriate cache line using a replacement policy utilizing Belady's optimal algorithm.

As stated above, FIG. 2 illustrates a block diagram of the software components used to form the replacement policy of the present invention in accordance with an embodiment of the present invention. In one embodiment, these software components are the components or modules of the program for evicting an appropriate cache line using a replacement policy utilizing Belady's optimal algorithm. It is noted that some or all of these software components discussed below may be implemented in hardware.

Referring to FIG. 2, the software components include a simulator 201 for simulating the behavior of Belady's optimal algorithm so as to provide inputs to train the predictor 202 of the present invention, which in turn provides information for making future eviction decisions. Furthermore, the software components include a sampler 203, which is used to reduce the amount of state required to simulate Belady's optimal algorithm's behavior. A more detailed description of these components is provided below in connection with FIG. 3.

From a conceptual standpoint, the goal of the present invention is to determine if an incoming line is cache-friendly or cache-averse: cache-friendly lines are inserted with a low eviction priority, whereas, cache-averse lines are marked as eviction candidates for future conflicts. Thus, the present invention applies Belady's optimal algorithm policy to previous accesses to learn whether incoming lines should be classified as either cache-friendly or cache-averse as discussed below in connection with FIG. 3.

FIG. 3 is a flowchart of a method 300 for utilizing Belady's optimal algorithm to train predictor 202 (FIG. 2) of the present invention in accordance with an embodiment of the present invention.

Referring to FIG. 3, in conjunction with FIGS. 1-2, in step 301, simulator 201 tracks the occupied cache capacity of a cache, such as L1 cache 104, at every time interval using an "occupancy vector."

As discussed above, simulator 201 is configured to simulate the behavior of Belady's optimal algorithm. In particular, simulator 201 reconstructs the behavior of the cache (e.g., L1 cache 104) as if the Belady's optimal algorithm policy had been used. In particular, simulator 201 answers the following question: Given a new reference to cache line X and a history of memory references (including a previous reference to X), would X be a cache hit or miss if Belady's optimal algorithm policy were being used?

To answer this question, simulator 201 needs to know the contents of the cache between the new reference to X and the previous reference to X. (Any memory reference Y that appears after the new reference to X can be ignored because Y occurs farther in the future than X.) The "liveness interval" of a cache line is defined to be the time period during which that line resides in the cache under Belady's optimal algorithm policy. As a result, simulator 201 can answer this question by computing, for each time step between the two references to X, the number of overlapping liveness intervals o. Intuitively, o is the number of lines contending for the cache. If o does not exceed the cache's capacity between the two references to X, then there is room for X, so the new access to X would be a cache hit; otherwise, the new access to X is a cache miss.

For example, consider the sequence of accesses in FIG. 4, where FIG. 4 illustrates the intuition used by simulator 201 to reconstruct the behavior of the cache as if Belady's optimal algorithm had been used in accordance with an embodiment of the present invention. As illustrated in FIG. 4, the cache capacity (number of cache lines of cache) is two, and the liveness intervals of A, B, and C never overlap, so they can all share the same cache line. Thus, the maximum number of overlapping liveness intervals never exceeds the cache capacity, and simulator 201 concludes that under Belady's optimal algorithm policy, the second access to X would be a cache hit.

To track liveness intervals, simulator 201 uses an occupancy vector that tracks the occupied cache capacity at every time interval; each occupancy vector entry contains the number of cache lines contending for the cache as discussed further below.

In step 302, simulator 201 retroactively assigns cache capacity to the cache lines in the order of their reuse. On a reuse, a line is considered to be a cache hit if cache capacity is available at all times between the two subsequent accesses. If this condition is not satisfied, simulator 201 infers that the cache capacity falls short of the demand, and the given line would have been victimized by Belady's algorithm because it is re-referenced after all the lines that were able to claim cache capacity. In such a scenario, simulator 201 marks the given line as a cache miss.

In step 303, simulator 201 updates the occupancy vector using a last touch timestamp of the current memory address as discussed further below in connection with FIGS. 5A-5C.

In step 304, simulator 201 determines if the current memory address results in a cache hit or a cache miss based on the updated occupancy vector as discussed further below in connection with FIGS. 5A-5C.

FIG. 5A shows the example access stream and FIG. 5B shows Belady's optimal algorithm's solution in accordance with an embodiment of the present invention. FIG. 5C then shows how simulator 201 recreates the Belady's optimal algorithm's solution as it sees each incoming load in accordance with an embodiment of the present invention. Here, each row represents the occupancy vector for a different time interval, with time moving from the top to the bottom. More precisely, each time a new cache line X is loaded, simulator 201 updates the occupancy vector in FIG. 5C as follows.

If this is the first access to X, the occupancy vector is not updated. As a result, streaming accesses never hit in the cache.

If X has been accessed before, then simulator 201 considers X to be a cache hit if the occupancy vector entries are below the cache capacity for every time quantum between the previous and the current use of X. For example, in FIG. 5C, D hits in the cache at time step 8 because at time step 7, all occupancy vector entries between the two uses of D at time steps 4 and 8 are less than 2. By contrast, E is not cached at time step 9 because at time step 8, the occupancy vector entries between the two accesses to E at time steps 5 and 9 are greater than or equal to 2.

On a cache hit, the occupancy vector entries are incremented for every time quantum between the two consecutive accesses to X, thereby indicating cache occupancy during this time period. For example, because D hits in the cache, the occupancy vector at time step 7 is incremented by 1 for all entries between the two uses of D at time steps 4 and 8 (the updated occupancy vector is shown at time step 8). By contrast, the occupancy vector does not change from time step 8 to time step 9 because E misses in the cache.

The example in FIGS. 5A-5C highlights two important points. First, by reconstructing Belady's optimal algorithm's solution, simulator 201 is able to recognize both long-term and short-term reuses that are cache friendly. For example, both A and B hit in the cache even though the reuse interval of A far exceeds the cache capacity. Second, simulator 201 can be implemented in hardware with very little logic because the state of the occupancy vector can be maintained with simple read, write, and compare operations.

In step 305, simulator 201 identifies the load instruction that last accessed the current memory address.

In step 306, simulator 201 sends the indication of a cache hit or cache miss as determined in step 304 as well as the identified load instruction in step 305 to predictor 202 to train predictor 202 to appropriately classify the cache line of a cache with a low eviction priority or a high eviction priority as discussed further below in connection with FIG. 6.

FIG. 6 is a flowchart of a method 600 for storing a replacement state used for evicting an appropriate cache line in accordance with an embodiment of the present invention.

Referring to FIG. 6, in conjunction with FIGS. 1-5, in step 601, predictor 202 receives a load instruction.

In step 602, predictor 202 generates a predictor bit to indicate whether the cache line of the cache (e.g., L1 cache 104) is to be classified with a low eviction priority or a high eviction priority based on training as discussed further below.

In step 603, predictor 202 optionally generates a bias bit (corresponding to the confidence level in the prediction of step 602) to indicate a bias or confidence towards the classification as discussed further below. In one embodiment, the bias bit is used in conjunction with the predictor bit as the replacement state for the cache line which is utilized for determining whether to evict the cache line as discussed further below.

Predictor 202 classifies the cache lines loaded by a given program counter (PC) (not shown in FIG. 1) as either cache-friendly or cache-averse. Predictor 202 builds on the observation that Belady's optimal algorithm's decisions for load instructions by a given PC are similar and therefore predictable. That is, the probability that the load instructions by the same PC have the same caching behavior as Belady's optimal algorithm is high and therefore predictable.

Therefore, for each load instruction, predictor 202 learns whether previous loads by the given instruction would have resulted in hits or misses with Belady's optimal algorithm's policy. In particular, if simulator 201 determines that a line X would be a cache hit under Belady's optimal algorithm's policy, then the PC that last accessed X is trained positively; otherwise, the PC that last accessed X is trained negatively. In one embodiment, predictor 202 uses 4-bit counters for training and a 13-bit hashed PC for indexing.

For every cache access, predictor 202 generates a binary prediction ("predictor bit") (high-order bit of the 4-bit counter) to indicate whether the line is cache-friendly or cache-averse. Occasionally, load instructions will have a low bias (low confidence level in the prediction), which will result in inaccurate predictions so predictor 202 learns not just the binary classification for each load instruction but also a 1-bit bias (high or low) of this classification. The "bias bit" is incremented when the counter value crosses the prediction threshold, that is, when the high order bit goes from 0 to 1 (all counters are initialized to 0b1000). In one embodiment, the bias bit is initialized to 1.

In step 604, a determination is made by predictor as to whether the value of the predictor bit indicates cache-averse (e.g., predictor bit has a value of 1). If the value of the predictor bit indicates cache-averse, then, in step 605, predictor 202 sets the value of a counter associated with that cache line to a first value (e.g., value of 7).

If, however, the value of the predictor bit does not indicate cache-averse (i.e., the predictor bit indicates cache-friendly), then, in step 606, a determination is made by predictor 202 as to whether it received an indication of a cache miss for the cache line.

If predictor 202 received an indication of a cache miss for the cache line, then, in step 607, predictor 202 sets the counter for the cache line to a second value (e.g., value of 0) as well as increments the counter for each of the cache lines in the set.

If, however, predictor 202 did not receive an indication of a cache miss for the cache line (i.e., received an indication of a cache hit), then, in step 608, predictor 202 sets the counter for the cache line to a second value (e.g., value of 0).

Upon setting the counter to a first value or a second value in steps 605, 607 and 608, in step 609, predictor 202 stores a replacement state, which includes the counter value and optionally the bias bit, for the cache line.

On a cache miss, an appropriate cache line is evicted before the new cache line can be inserted with the obtained replacement state as discussed below in connection with FIG. 7.

FIG. 7 is a flowchart of a method 700 for evicting an appropriate cache line using a replacement policy utilizing Belady's optimal algorithm in accordance with an embodiment of the present invention.

Referring to FIG. 7, in conjunction with FIGS. 1-6, in step 701, a determination is made by predictor 202 as to whether it located a cache line associated with a counter value of a first value (e.g., value of 7) (i.e., a determination is made by predictor 202 as to whether it located a cache line that is classified as cache-averse). If predictor 202 located a cache line associated with the counter value of the first value, then, in step 702, predictor 202 evicts the cache line.

If, however, predictor 202 did not locate a cache line associated with the counter value of the first value (i.e., located a cache line classified as cache-friendly), then, in step 703, a determination is made by predictor 202 as to whether it located a cache line associated with a counter value that is less than the first value (e.g., value of 0) and is associated with a low bias bit value (e.g., bias bit has a value of 0).

If predictor 202 located a cache line associated with a counter value that is less than the first value (e.g., value of 0) and is associated with a low bias bit value, then, in step 704, predictor 202 evicts the cache line.

If, however, predictor 202 did not locate a cache line associated with a counter value that is less than the first value (e.g., value of 0) and is associated with a low bias bit value (i.e., locates a cache line with a counter value that is less than the first value and is associated with a high bit value, such as the value of 1), then, in step 705, predictor 202 identifies and evicts a Not Recently Used (NRU) candidate and detrains predictor 202 to facilitate changes in the working set as discussed further below.

Thus, in one embodiment, predictor 202 first chooses to evict cache-averse lines, as identified by predictor 202. If no cache lines are predicted to be cache-averse, then the oldest cache-friendly line (LRU) is evicted, allowing predictor 202 to adapt to phase changes. This scheme is likely to evict cache-averse lines from the new working set before evicting cache-friendly lines from the old working set, but this behavior is harmless because cache-averse lines from the new working set are likely to be evicted anyway. To correct the state of predictor 202 after a phase change, predictor 202 is detrained when cache-friendly lines are evicted. In particular, when a cache-friendly line is evicted, the predictor entry corresponding to the last load PC of the evicted cache line is decremented if the evicted cache line is present in sampler 203.

The following techniques are used to reduce the hardware budget.

To reduce the size of the occupancy vector, its granularity is increased so that each element represents a time quantum, a unit of time as measured in terms of cache accesses. In one embodiment, a time quantum of four cache accesses is utilized, which for a 16-way set-associative cache reduces the size of the occupancy vector from 128 to 32 entries.

Since occupancy vector entries for 16-way set-associative caches are 4 bits wide, the occupancy vector for each set requires 16 bytes of storage, which for a 2 MB cache would still amount to 32 KB storage for all occupancy vectors (2048 sets×16 bytes per set).

To further reduce the hardware requirements, the idea of "set dueling" is utilized which monitors the behavior of a few randomly chosen sets (sets of cache lines) to make predictions for the entire cache. In one embodiment, to extend "set dueling" to the present invention, simulator 201 reconstructs the optimal solution for only 64 randomly chosen sets. In one embodiment, the concept of "set dueling" reduces the storage requirements of the present invention in two ways. First, since simulator 201 now maintains occupancy vectors for 64 sets, the storage overhead for all occupancy vectors is only 1 KB (64 occupancy vectors×16 bytes per occupancy vector). Second, it dramatically reduces the size of the history, which now tracks usage intervals for only 64 sampled sets.

To track usage intervals for the sampled sets, a sampled cache may be used. The sampled cache is a distinct structure from last level cache 105, and each entry in the sampled cache maintains a 2-byte address tag, a 2-byte load instruction PC, and a 1-byte timestamp. For 64 sets, the sampled cache would need to track a maximum of 8K addresses to capture usage intervals spanning a history of 8× the size of the cache, but it has been found that because of repeated accesses to the same address, 2400 entries in the sampled cache are enough to provide an 8× history of accesses for a 2 MB cache. Thus, in one embodiment, the total size of the sampled cache is 12 KB, and a Least Recently Used (LRU) policy for eviction is used when the sampled cache is full.

In summary, to train predictor 202 of the present invention, simulator 201 reconstructs the Belady's optimal algorithm solution for incoming cache accesses and trains the corresponding PC appropriately. Therefore, on a cache access, X, predictor 202 probes sampler 203 to determine if it has information about the last access to X. On a sampler hit, simulator 201 reconstructs Belady's optimal algorithm's solution (and updates the occupancy vector) using the last touch timestamp of the current memory address. It also trains predictor 202 with Belady's optimal algorithm's solution (cache hit or miss) and the last touch PC.

For every cache access, predictor 202 takes as input the incoming load address, and it produces as output a prediction (may include simply the predictor bit or both the predictor and bias bits), which is used to determine the replacement state (which includes the counter value) in the cache tag array. The predictor bit represents the binary classification that predictor 202 has learned, and the bias bit represents the bias (or confidence) of the prediction.

On a cache conflict, the predictions are used to evict the least desirable cache line. In one embodiment, the first choice for eviction would be any replacement candidate that is predicted to be cache-averse. The majority of evictions can be accomplished by choosing a cache-averse replacement candidate, but when there are no cache-averse candidates, predictor 202 chooses to replace a candidate that is predicted to be cache-friendly with a low bias. Finally, in the rare case where all replacement candidates are predicted to be cache-friendly with a high bias, then predictor 202 is incorrect likely due to a phase change. Therefore, in this scenario, the present invention chooses the Not Recently Used (NRU) candidate and detrains predictor 202 to facilitate changes in the working set.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

The invention claimed is:

1. A method for cache replacement, the method comprising:
   tracking, by a processor, an occupied cache capacity of a simulated cache at every time interval using an occupancy vector, wherein said occupancy vector contains a number of cache lines contending for said simulated cache, wherein said cache capacity corresponds to a number of cache lines of said simulated cache;
   retroactively assigning said cache capacity to cache lines of said simulated cache in order of their reuse, wherein a cache line is considered to be a cache hit utilizing Belady's optimal algorithm if said cache capacity is available at all times between two subsequent accesses, wherein a cache line is considered to be a cache miss utilizing said Belady's optimal algorithm if said cache capacity is not available at all times between said two subsequent accesses;
   updating said occupancy vector using a last touch timestamp of a current memory address;

determining if said current memory address results in a cache hit or a cache miss utilizing said Belady's optimal algorithm based on said updated occupancy vector; and storing a replacement state used for evicting a cache line of a cache using results of said determination.

2. The method as recited in claim 1, wherein an access to a first content in said cache line of said simulated cache is considered to be a cache hit in response to a number of occupancy vector entries of said occupancy vector being below said cache capacity for every time quantum between a previous and a current use of said first content.

3. The method as recited in claim 2 further comprising:
incrementing said occupancy vector entries for every time quantum between two consecutive accesses for said first content.

4. The method as recited in claim 1, wherein an access to a first content in said cache line of said simulated cache is considered to be a cache miss in response to occupancy vector entries of said occupancy vector between a previous and a current use of said first content being equal to or greater than said cache capacity.

5. The method as recited in claim 1 further comprising:
identifying a load instruction that last accessed said current memory address; and
sending an indication as to whether said current memory address resulted in said cache hit or said cache miss as well as said identified load instruction to a predictor to train said predictor to appropriately classify said cache line of said cache with a low eviction priority or a high eviction priority.

6. The method as recited in claim 5 further comprising:
receiving a load instruction; and
generating a first indicator to indicate whether said cache line of said cache is to be classified with said low eviction priority or said high eviction priority in response to determining if said load instruction results in said cache hit or said cache miss based on said training.

7. The method as recited in claim 6 further comprising:
generating a second indicator to indicate a bias towards said classification.

8. The method as recited in claim 7 further comprising:
evicting said cache line of said cache in response to said cache line being associated with a counter value that is less than a first value and in response to said second indictor indicating a low bias for all replacement candidates having a low eviction priority.

9. The method as recited in claim 7 further comprising:
identifying and evicting a Not Recently Used (NRU) candidate in response to said cache line being associated with a counter value that is less than a first value and in response to said second indictor indicating a high bias for all replacement candidates having a low eviction priority.

10. The method as recited in claim 6 further comprising:
setting a counter associated with said cache line of said cache to a first value in response to said first indicator having a first value.

11. The method as recited in claim 10 further comprising:
storing a replacement state that includes said counter value for said cache line of said cache, wherein said replacement state for said cache line of said cache is used for evicting a least desirable cache line.

12. The method as recited in claim 11 further comprising:
evicting said cache line of said cache in response to said cache line being associated with said counter value of said first value.

13. The method as recited in claim 6 further comprising:
setting a counter associated with said cache line to a second value in response to said first indicator having a second value.

14. The method as recited in claim 13 further comprising:
incrementing a counter for each cache line in a set of cache lines in response to receiving an indication of said cache miss.

15. The method as recited in claim 13 further comprising:
storing a replacement state that includes said counter value for said cache line of said cache, wherein said replacement state for said cache line of said cache is used for evicting a least desirable cache line.

16. The method as recited in claim 1 further comprising:
reducing a size of said occupancy vector using a granularity of time.

17. The method as recited in claim 1 further comprising:
constructing said occupancy vector by monitoring behavior of randomly selected sets of said cache.

18. A computer program product for cache replacement, the computer program product comprising a computer readable storage medium having program code embodied therewith, the program code comprising the programming instructions for:
tracking an occupied cache capacity of a simulated cache at every time interval using an occupancy vector, wherein said occupancy vector contains a number of cache lines contending for said simulated cache, wherein said cache capacity corresponds to a number of cache lines of said simulated cache;
retroactively assigning said cache capacity to cache lines of said simulated cache in order of their reuse, wherein a cache line is considered to be a cache hit utilizing Belady's optimal algorithm if said cache capacity is available at all times between two subsequent accesses, wherein a cache line is considered to be a cache miss utilizing said Belady's optimal algorithm if said cache capacity is not available at all times between said two subsequent accesses;
updating said occupancy vector using a last touch timestamp of a current memory address;
determining if said current memory address results in a cache hit or a cache miss utilizing said Belady's optimal algorithm based on said updated occupancy vector; and
storing a replacement state used for evicting a cache line of a cache using results of said determination.

19. The computer program product as recited in claim 18, wherein an access to a first content in said cache line of said simulated cache is considered to be a cache hit in response to a number of occupancy vector entries of said occupancy vector being below said cache capacity for every time quantum between a previous and a current use of said first content.

20. The computer program product as recited in claim 19, wherein the program code further comprises the programming instructions for:
incrementing said occupancy vector entries for every time quantum between two consecutive accesses for said first content.

21. The computer program product as recited in claim 18, wherein an access to a first content in said cache line of said simulated cache is considered to be a cache miss in response to occupancy vector entries of said occupancy vector between a previous and a current use of said first content being equal to or greater than said cache capacity.

22. The computer program product as recited in claim 18, wherein the program code further comprises the programming instructions for:
identifying a load instruction that last accessed said current memory address; and
sending an indication as to whether said current memory address resulted in said cache hit or said cache miss as well as said identified load instruction to a predictor to train said predictor to appropriately classify said cache line of said cache with a low eviction priority or a high eviction priority.

23. The computer program product as recited in claim 22, wherein the program code further comprises the programming instructions for:
receiving a load instruction; and
generating a first indicator to indicate whether said cache line of said cache is to be classified with said low eviction priority or said high eviction priority in response to determining if said load instruction results in said cache hit or said cache miss based on said training.

24. The computer program product as recited in claim 23, wherein the program code further comprises the programming instructions for:
generating a second indicator to indicate a bias towards said classification.

25. The computer program product as recited in claim 24, wherein the program code further comprises the programming instructions for:
evicting said cache line of said cache in response to said cache line being associated with a counter value that is less than a first value and in response to said second indictor indicating a low bias for all replacement candidates having a low eviction priority.

26. The computer program product as recited in claim 24, wherein the program code further comprises the programming instructions for:
identifying and evicting a Not Recently Used (NRU) candidate in response to said cache line being associated with a counter value that is less than a first value and in response to said second indictor indicating a high bias for all replacement candidates having a low eviction priority.

27. The computer program product as recited in claim 23, wherein the program code further comprises the programming instructions for:
setting a counter associated with said cache line of said cache to a first value in response to said first indicator having a first value.

28. The computer program product as recited in claim 27, wherein the program code further comprises the programming instructions for:
storing a replacement state that includes said counter value for said cache line of said cache, wherein said replacement state for said cache line of said cache is used for evicting a least desirable cache line.

29. The computer program product as recited in claim 28, wherein the program code further comprises the programming instructions for:
evicting said cache line of said cache in response to said cache line being associated with said counter value of said first value.

30. The computer program product as recited in claim 23, wherein the program code further comprises the programming instructions for:
setting a counter associated with said cache line to a second value in response to said first indicator having a second value.

31. The computer program product as recited in claim 30, wherein the program code further comprises the programming instructions for:
incrementing a counter for each cache line in a set of cache lines in response to receiving an indication of said cache miss.

32. The computer program product as recited in claim 30, wherein the program code further comprises the programming instructions for:
storing a replacement state that includes said counter value for said cache line of said cache, wherein said replacement state for said cache line of said cache is used for evicting a least desirable cache line.

33. The computer program product as recited in claim 18, wherein the program code further comprises the programming instructions for:
reducing a size of said occupancy vector using a granularity of time.

34. The computer program product as recited in claim 18, wherein the program code further comprises the programming instructions for:
constructing said occupancy vector by monitoring behavior of randomly selected sets of said cache.

35. A system, comprising:
a memory unit for storing a computer program for cache replacement; and
a processor coupled to the memory unit, wherein the processor is configured to execute the program instructions of the computer program comprising:
tracking an occupied cache capacity of a simulated cache at every time interval using an occupancy vector, wherein said occupancy vector contains a number of cache lines contending for said simulated cache, wherein said cache capacity corresponds to a number of cache lines of said simulated cache;
retroactively assigning said cache capacity to cache lines of said simulated cache in order of their reuse, wherein a cache line is considered to be a cache hit utilizing Belady's optimal algorithm if said cache capacity is available at all times between two subsequent accesses, wherein a cache line is considered to be a cache miss utilizing said Belady's optimal algorithm if said cache capacity is not available at all times between said two subsequent accesses;
updating said occupancy vector using a last touch timestamp of a current memory address;
determining if said current memory address results in a cache hit or a cache miss utilizing said Belady's optimal algorithm based on said updated occupancy vector; and
storing a replacement state used for evicting a cache line of a cache using results of said determination.

36. The system as recited in claim 35, wherein an access to a first content in said cache line of said simulated cache is considered to be a cache hit in response to a number of occupancy vector entries of said occupancy vector being below said cache capacity for every time quantum between a previous and a current use of said first content.

37. The system as recited in claim 36, wherein the program instructions of the computer program further comprise:
incrementing said occupancy vector entries for every time quantum between two consecutive accesses for said first content.

38. The system as recited in claim 35, wherein an access to a first content in said cache line of said simulated cache is considered to be a cache miss in response to occupancy vector entries of said occupancy vector between a previous and a current use of said first content being equal to or greater than said cache capacity.

39. The system as recited in claim 35, wherein the program instructions of the computer program further comprise:
  identifying a load instruction that last accessed said current memory address; and
  sending an indication as to whether said current memory address resulted in said cache hit or said cache miss as well as said identified load instruction to a predictor to train said predictor to appropriately classify said cache line of said cache with a low eviction priority or a high eviction priority.

40. The system as recited in claim 39, wherein the program instructions of the computer program further comprise:
  receiving a load instruction; and
  generating a first indicator to indicate whether said cache line of said cache is to be classified with said low eviction priority or said high eviction priority in response to determining if said load instruction results in said cache hit or said cache miss based on said training.

41. The system as recited in claim 40, wherein the program instructions of the computer program further comprise:
  generating a second indicator to indicate a bias towards said classification.

42. The system as recited in claim 41, wherein the program instructions of the computer program further comprise:
  evicting said cache line of said cache in response to said cache line being associated with a counter value that is less than a first value and in response to said second indictor indicating a low bias for all replacement candidates having a low eviction priority.

43. The system as recited in claim 41, wherein the program instructions of the computer program further comprise:
  identifying and evicting a Not Recently Used (NRU) candidate in response to said cache line being associated with a counter value that is less than a first value and in response to said second indictor indicating a high bias for all replacement candidates having a low eviction priority.

44. The system as recited in claim 40, wherein the program instructions of the computer program further comprise:
  setting a counter associated with said cache line of said cache to a first value in response to said first indicator having a first value.

45. The system as recited in claim 44, wherein the program instructions of the computer program further comprise:
  storing a replacement state that includes said counter value for said cache line of said cache, wherein said replacement state for said cache line of said cache is used for evicting a least desirable cache line.

46. The system as recited in claim 45, wherein the program instructions of the computer program further comprise:
  evicting said cache line of said cache in response to said cache line being associated with said counter value of said first value.

47. The system as recited in claim 40, wherein the program instructions of the computer program further comprise:
  setting a counter associated with said cache line to a second value in response to said first indicator having a second value.

48. The system as recited in claim 47, wherein the program instructions of the computer program further comprise:
  incrementing a counter for each cache line in a set of cache lines in response to receiving an indication of said cache miss.

49. The system as recited in claim 47, wherein the program instructions of the computer program further comprise:
  storing a replacement state that includes said counter value for said cache line of said cache, wherein said replacement state for said cache line of said cache is used for evicting a least desirable cache line.

50. The system as recited in claim 35, wherein the program instructions of the computer program further comprise:
  reducing a size of said occupancy vector using a granularity of time.

51. The system as recited in claim 35, wherein the program instructions of the computer program further comprise:
  constructing said occupancy vector by monitoring behavior of randomly selected sets of said cache.

* * * * *